Aug. 19, 1941. S. B. HASELTINE 2,252,889
CAR CONSTRUCTION
Filed Oct. 27, 1939
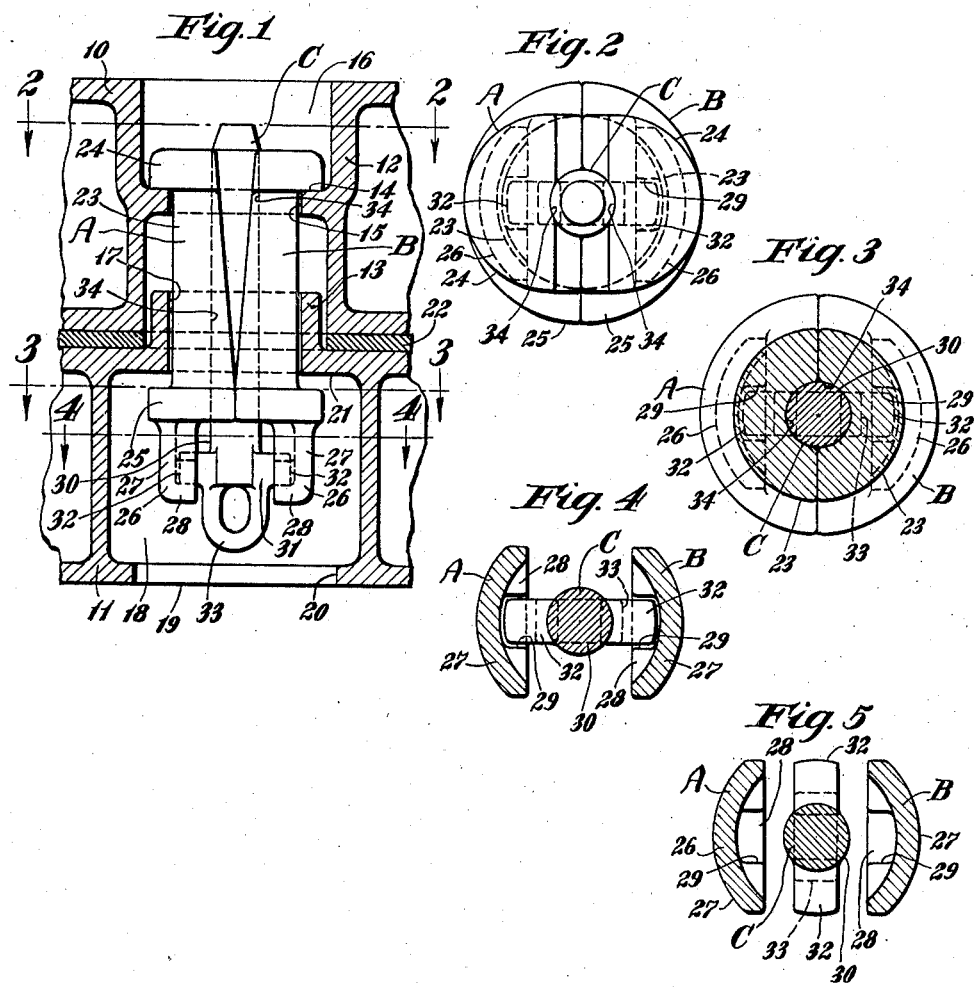
Inventor
Stacy B. Haseltine
By Henry Fuchs
Atty.

Patented Aug. 19, 1941

2,252,889

UNITED STATES PATENT OFFICE 2,252,889

CAR CONSTRUCTION

Stacy B. Haseltine, La Grange, Ill., assignor to W. H. Miner, Inc., Chicago, Ill., a corporation of Delaware Application October 27, 1939, Serial No. 301,569

6 Claims. (Cl. 105—200)

This invention relates to improvements in car construction.

In the operation of railroads, it has been the practice to connect the body and truck bolsters of a car by a locking center pin to hold the bolsters against vertical separation while in service. Sectional pins which are expansible to interlock with shoulders on the bolsters have been employed for this purpose. However, in the case of certain types of cars, the construction is such that it is impossible to insert these locking pins from the top of the underframing and the pin must therefore be inserted from the underneath side of the truck bolster.

One object of the invention is to provide an improved car construction, particularly for cars wherein the pin must be applied from underneath the truck bolster, wherein the pin is composed of sections which may be expanded to interlock with the bolsters and may be readily applied from underneath the truck bolster and locked in position by a central filler element which acts as the spreading means, which filler element is accessible for manipulation from beneath said truck bolster and may be readily observed to facilitate locking and unlocking of the same.

Another object of the invention is to provide a bolster locking center pin of the character set forth in the preceding paragraph, comprising a pair of outer sections or members headed at opposite ends for shouldered engagement with the bolsters, and a central filler or spreader element which is rotatable to bring the same into shouldered locking engagement with means at the lower ends of the outer members of the pin to hold said spreader element against removal in a downward direction from between said outer members.

A further object of the invention is to provide a bolster locking center pin comprising a pair of outer sections and a central filler section or element for holding the outer sections separated, wherein the outer sections have laterally, inwardly projecting supporting ledges at their lower ends and the filler element has laterally projecting portions adapted to rest on said ledges to hold the filler element against removal in a downward direction.

Other objects of the invention will more clearly appear from the description and claims hereinafter following.

In the drawing forming a part of this specification, Figure 1 is a vertical sectional view taken lengthwise of the car through the mid-portions of the body and truck bolsters of the underframe structure, illustrating my improvements in connection therewith, the center pin being shown in elevation. Figures 2, 3 and 4 are horizontal sectional views of the center pin only, corresponding respectively to the lines 2—2, 3—3, and 4—4 of Figure 1. Figure 5 is a view similar to Figure 4, but showing certain parts in different position.

In said drawing, 10 indicates the body bolster of the car and 11 the truck bolster. These bolsters are of usual well-known design, the body bolster being provided with a center section 12 to accommodate the center pin, and the truck bolster being provided with an upstanding hollow boss or flange 13 projecting into the section 12 of the body bolster. The section 12 is of substantially tubular form having an inwardly projecting, horizontally disposed, interior, annular flange or rib 14 between the top and bottom ends thereof. The flange 14 defines an opening 15 adapted to accommodate the center pin. Above the flange 14 the section 12 forms a pocket 16 to accommodate the head at the upper end of the pin. The annular hollow boss or upstanding flange 13 of the truck bolster 11 extends into the bottom portion of the opening of the section 12 of the body bolster, as most clearly shown in Figure 1. The hollow boss provides a circular opening 17 to accommodate the center pin. The opening 17 of the truck bolster and the opening 15 of the body bolster are in axial alignment. Below the opening 17 the truck bolster is provided with a pocket 18 having a bottom wall 19. The bottom wall 19 has an opening 20 therethrough, axially aligned with the openings 15 and 17, but of greater diameter than these openings. The pocket 18 serves the purpose of accommodating the head at the bottom end of the center pin. As shown in Figure 1, the pocket 18 is of greater size than the opening 17 of the boss 13, thereby providing a downwardly facing shoulder 21 adjacent said opening, which cooperates with the head at the bottom end of the center pin to restrict upward movement of the latter. The usual bearing plate or shim 22 is interposed between the body and truck bolsters around the upwardly projecting boss 13 of the truck bolster.

My improved locking center pin comprises broadly a pair of outer members or sections A and B and a central spreader or filler element C.

The two outer members A and B are of the same design, but reversely arranged, as will hereinafter appear. Each outer member comprises a substantially semi-cylindrical shank 23 and heads 24 and 25 at the top and bottom ends of the shank. The top head 24 is in the form of an eccentric, substantially semi-cylindrical, outstanding flange, and the bottom head 25 is in the form of a concentric, substantially semi-cylindrical flange. The inner sides of the members A and B are in contact at their lower ends and diverge upwardly away from each other from said zone of contact, this contact being on substantially flat vertical faces, preferably of a vertical height at least as great as the thickness of the flange or head 25 of either outer members. The diverging arrangement of the upper portions of the members A and B permits collapse of said upper portions of the pin to make possible removal of the members of said pin.

The heads 24—24 at the upper ends of the members A and B are made of such a size and contour that they will pass freely through the pin receiving openings 15 and 17 of the body and truck bolsters when these members are inserted or removed, in succession from underneath the truck bolster, with the filler element absent, so that the upper portion of the center pin may be collapsed.

At the bottom side of the head 25 of each member A and B, there is a depending lug 26. Each lug 26 comprises a vertically disposed, transversely curved wall 27 having a laterally, inwardly directed, horizontal shelf or ledge 28 at its lower end portion. The ledge 28 is provided on its upper side with an upwardly opening slot forming a seat 29 substantially radial to the vertical center line of the pin. As will be seen upon reference to Figures 1 and 4, the lugs 26—26 are spaced apart a considerable distance and are reversely arranged, that is, with the concave sides of the walls 27—27 facing each other.

The filler element C comprises a cylindrical shank 30 and a head 31 at the lower end of the shank. The head 31 has radially, oppositely projecting wings 32—32 thereon and a depending eye portion 33. The wings 32—32 are of such a length that they overlap the shelves 28—28 of the lugs when the element C is in the position shown in Figures 1 and 4, and are of such a thickness that they seat freely in the seats 29—29 of said shelves or ledges 28—28. The element C is of such a length that the eye portion 33 at its lower end protrudes beyond the lower end limits of the outer members A and B, thus making it readily accessible to the attendant for manipulation of the element C.

The top end of the shank of the element C is preferably beveled off, as shown, to facilitate insertion of said element between the outer members A and B of the pin.

The inner sides of the members A and B are centrally, vertically slotted or grooved, as indicated at 34 in Figure 3, and as shown in dotted lines in Figure 1. These slots or grooves are of concave cross section and when the members A and B of the pin are in assembled position form a central bore in which the shank 30 of the element C fits loosely and is rotatable.

As will be seen upon reference to Figures 1, 2, 3, and 4, when the pin, comprising the outer members A and B and the filler element C interposed between said sections, is applied to the bolsters, the shank of the pin substantially fits the openings 15 and 17 of the body and truck bolsters, with the heads 24—24 and 25—25 disposed respectively above the shoulder presented by the flange or rib 14 of the body bolster, and below the shoulder 21 of the truck bolster. The pin is thus held against removal in both downward and upward directions.

In applying the center pin to the bolsters, one of the members A or B is first inserted through the openings of the bolsters from underneath the truck bolster, and displaced laterally outwardly to engage the heads 24 and 25 thereof with the shoulders of the bolsters. After this has been done, the other member is then inserted from underneath the truck bolster, being passed through the opening of the bolster in inclined position so that the upper headed end will pass freely through said opening. As will be evident, the diverging relation of the upper portions of the members A and B provides the required clearance between the inner sides of said members to permit inclining of the member last inserted to the proper extent. After the second member has been fully inserted, it is displaced laterally outwardly at its upper end to bring the head 24 thereof into shouldered engagement with the body bolster 10. Due to the fact that the members A and B have their inner side faces adjacent the lower end of the pin contacting, the head 25 at the lower end of the member last inserted will be forced to engage beneath the shoulder 21 of the truck bolster, when the members A and B are in the assembled position shown in Figure 1. The filler element C is next inserted between the members A and B from underneath the truck bolster to hold the upper ends of said outer members separated and in shouldered engagement with the body bolster. Before application of the element C, it is turned so that the wings 32—32 thereof are in alignment with and extend lengthwise of the opening between the lugs 26—26 at the lower ends of the members A and B, as clearly shown in Figure 5. Inasmuch as the wings 32—32, when in this position, pass freely between the lugs 26—26, the filler element may be shoved upwardly until the wings are brought to a position above the level of the shelves 28—28 of said lugs. With the wings thus positioned above the level of the shelves, the element C is given a quarter turn, thereby bringing the wings into registration with the slots or seats 29—29. In this connection it is pointed out that the outer members A and B of the pin are held against relative rotation or shifting with respect to each other about the axis of the pin by the contact provided on their inner sides at the lower ends thereof, thus at all times maintaining the lugs and their seats in transverse alignment, thereby assuring proper accommodation of the wings 32—32 of the element C in said slots. The element C is then permitted to drop downwardly or is pulled down forcibly by the eye 33, to seat the wings in the slots 29—29. This is clearly shown in Figures 1 and 4. As will be evident, the element C is thus held locked against rotation with respect to the members A and B, thereby preventing the wings 32—32 of said element from reaching a position of alignment with the opening between the lugs 26—26 and possible accidental dropping out of the element C from between the members A and B.

In removing the center pin, the reverse procedure is followed. The element C is first shoved upwardly to lift the wings 32—32 thereof clear of the seats 29—29 of the lugs at the lower ends of the members A and B and is then given a quarter turn to align the wings with the opening between the lugs. The element C is then withdrawn from between the members A and B by pulling the same downwardly, a hook or similar tool being used for this purpose, the eye 33 serving as a convenient means for anchoring the hook. After withdrawal of the filler element, the outer members are removed in succession, the upper end of the pin being first collapsed by rocking one of the members A or B toward the other, thus bringing the top head 24 of the member which is rocked into registration with the pin receiving openings of the bolsters.

I have herein shown and described what I now consider the preferred manner of carrying out my invention, but the same is merely illustrative and I contemplate all changes and modifications that come within the scope of the claims appended hereto.

I claim:

1. In car construction, the combination with body and truck bolsters having aligned center pin receiving openings; of a center pin insertable from beneath said truck bolster, said pin including a pair of outer members headed at opposite ends for shouldered engagement with the bolsters, and a central filler element interposed between said outer members for holding the same spread apart, said filler element being rotatable and having a laterally extending projection at its lower end and one of said outer members having a lug at its lower end provided with a ledge on which said projection is seated by rotation of said filler element to hold the latter against removal in downward direction.

2. In car construction, the combination with body and truck bolsters having aligned center pin receiving openings; of a center pin insertable from beneath said truck bolster, said pin including outer members headed at opposite ends and a central filler element between said outer members, said filler element holding the pin expanded with the heads thereof in shouldered engagement with the bolsters; spaced retaining ledges on the lower ends of the outer members; and a transverse locking portion on said element adapted to pass between said lugs in one position of said element, said element being rotatable to bring said locking portion into position to overhang and rest on said ledges to support said element against withdrawal in a downward direction from between said outer members.

3. In a locking pin of the character described, the combination with elongated outer members having retaining flanges at the top and bottom ends thereof; of a filler element between said outer members, said filler element being rotatable with respect to said members; supporting ledges at the bottom ends of said outer members; and a transversely disposed, elongated locking member at the lower end of said element adapted to rest on said ledges to support said element against downward displacement, said ledges being spaced apart a distance greater than the width of said elongated locking member to provide an opening therebetween to permit passage of said locking member when said element has been rotated to a position to align said locking element with said opening.

4. In a locking pin of the character described, the combination with a pair of elongated outer members having retaining flanges at the top and bottom ends; of an elongated cylindrical filler element between said outer members, said outer members being cut out to accommodate said cylindrical element; opposed key supporting pockets on said outer members at the bottom ends thereof, said pockets having openings facing each other; and an elongated, transverse, rigid key portion on said filler element, said key portion being of a width to pass between said pockets, and of greater length than the spacing between said opposed pockets.

5. In a locking pin of the character described, the combination with an elongated central filler element of cylindrical cross section; of a pair of elongated outer members embracing said filler element at opposite sides, said outer members being headed at opposite ends; opposed supporting ledges on the lower ends of said outer members; and diametrically aligned supporting lugs on the lower end of said filler element supported on said ledges when said filler element is in one position, said lugs being of a width to pass freely between said ledges when said element is rotated through an arc of 90° from said position.

6. In a locking pin of the character described, the combination with a pair of outer members headed at the top and bottom ends; of a rotatable cylindrical filler element between said outer members for holding the same separated; opposed, horizontally disposed, supporting ledges on said outer members at the bottom ends thereof, said ledges having upwardly opening seats at opposite sides of the center pin; and oppositely projecting, horizontal fixed arms on the bottom end of said filler element supported on said ledges and engaged within the seats thereof to hold said central element against rotation.

STACY B. HASELTINE.